(12) United States Patent
Radu et al.

(10) Patent No.: US 7,364,218 B2
(45) Date of Patent: Apr. 29, 2008

(54) AUTOMOTIVE HARDWARE CARRIER AND METHOD OF MAKING SAME

(75) Inventors: Bogdan Radu, Dearborn, MI (US); John D Youngs, Southgate, MI (US); James Gregory, Harrison Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 464 days.

(21) Appl. No.: 10/711,119

(22) Filed: Aug. 25, 2004
(Under 37 CFR 1.47)

(65) Prior Publication Data

US 2006/0043765 A1  Mar. 2, 2006

(51) Int. Cl.
*B60J 5/00* (2006.01)
(52) U.S. Cl. ............... 296/146.7; 49/502; 49/475.1
(58) Field of Classification Search ........... 296/146.7, 296/146.16; 277/644, 648, 649; 49/502, 49/475.1
See application file for complete search history.

(56) References Cited

U.S. PATENT DOCUMENTS

| | | |
|---|---|---|
| 4,885,121 A | 12/1989 | Patel |
| 4,923,542 A | 5/1990 | Janicki et al. |
| 5,076,631 A | 12/1991 | Lord, Jr. |
| 5,111,619 A | 5/1992 | Billin et al. ............ 49/502 |
| 5,345,720 A | 9/1994 | Illbruck et al. |
| 5,419,606 A | 5/1995 | Hull et al. |
| 5,462,482 A | 10/1995 | Grimes |
| 5,505,024 A | 4/1996 | DeRees et al. |
| 5,595,415 A | 1/1997 | Beaulat |
| 5,618,477 A | 4/1997 | Suzuki ............ 264/46.5 |
| 5,695,865 A | 12/1997 | Shimizu ............ 428/212 |

(Continued)

FOREIGN PATENT DOCUMENTS

DE       3827852       3/1989

(Continued)

OTHER PUBLICATIONS

U.S. Patent and Trademark Office, Office Action to related application U.S. Appl. No. 10/711,478 mailed Jul. 25, 2006.

(Continued)

*Primary Examiner*—Kiran B. Patel
(74) *Attorney, Agent, or Firm*—Wood, Herron & Evans, L.L.P.

(57) ABSTRACT

The present invention provides for an improved hardware carrier for use in a trim panel assembly, and a method of making the same. To this end, the hardware carrier includes a body having a front and back surface and a seal molded to the front surface of the body for contacting the doorframe structure of a motor vehicle to seal the carrier thereto. A two-shot molding process utilizing a single mold assembly is used to form the carrier, with the body being formed in the first shot and the seal being formed in the second shot so that the seal is bonded thereto. The molded seal advantageously is provided with a non-linear configuration, such as a substantially repeating v-shaped configuration, and includes a planar top surface. The non-linear configuration of the seal, in conjunction with the top planar surface, advantageously provides a substantial surface area for contacting the doorframe to prevent water leakage within the vehicle.

5 Claims, 8 Drawing Sheets

U.S. PATENT DOCUMENTS

| | | | |
|---|---|---|---|
| 5,866,232 A | 2/1999 | Gatzmanga | 428/122 |
| 5,902,004 A * | 5/1999 | Waltz et al. | 296/146.9 |
| 5,934,729 A | 8/1999 | Baack | |
| 5,947,547 A | 9/1999 | Deeks et al. | 296/146.7 |
| 5,975,622 A | 11/1999 | Koopman | |
| 6,076,882 A * | 6/2000 | Szerdahelyi et al. | 296/146.7 |
| 6,119,406 A | 9/2000 | Gulisano et al. | 49/502 |
| 6,183,038 B1 | 2/2001 | Hansen et al. | |
| 6,186,579 B1 | 2/2001 | Fussnegger et al. | |
| 6,196,607 B1 | 3/2001 | Gulisano | |
| 6,197,403 B1 | 3/2001 | Brown et al. | 428/137 |
| 6,210,613 B1 | 4/2001 | Stein et al. | 264/45.4 |
| 6,226,927 B1 | 5/2001 | Bertolini et al. | |
| 6,299,236 B1 | 10/2001 | Praud et al. | |
| 6,308,488 B1 | 10/2001 | Hoshino | 52/716.5 |
| 6,348,169 B1 | 2/2002 | Stipes et al. | |
| 6,354,653 B1 * | 3/2002 | Seeberger et al. | 296/146.7 |
| 6,378,931 B1 | 4/2002 | Kolluri et al. | |
| 6,393,766 B2 | 5/2002 | Nozaki et al. | |
| 6,409,250 B1 * | 6/2002 | Schultheiss | 296/146.7 |
| 6,412,852 B1 | 7/2002 | Kos et al. | |
| 6,416,113 B1 | 7/2002 | Page | |
| 6,422,640 B2 * | 7/2002 | Whitehead et al. | 296/146.7 |
| 6,425,208 B1 | 7/2002 | Klueger et al. | |
| 6,447,047 B1 | 9/2002 | Marcovecchio et al. | |
| 6,562,275 B1 | 5/2003 | Martinez | 264/308 |
| 6,594,955 B1 | 7/2003 | Delire et al. | |
| 6,616,216 B2 | 9/2003 | Furuyama et al. | |
| 6,619,725 B2 | 9/2003 | Gehringhoff et al. | |
| 6,656,397 B1 | 12/2003 | Hansen et al. | 264/45.4 |
| 6,659,536 B1 | 12/2003 | Chamberlain et al. | 296/146.5 |
| 6,669,267 B1 | 12/2003 | Lynam et al. | 296/146.5 |
| 6,676,195 B1 | 1/2004 | Marriott et al. | 296/146.7 |
| 6,698,140 B2 * | 3/2004 | Tatsumi et al. | 296/146.6 |
| 6,767,049 B1 * | 7/2004 | Morrison et al. | 296/146.7 |
| 6,823,628 B2 * | 11/2004 | Morrison et al. | 49/502 |
| 6,857,688 B2 * | 2/2005 | Morrison et al. | 296/146.7 |
| 6,899,373 B2 | 5/2005 | Kim | |
| 6,920,720 B2 * | 7/2005 | Sommer et al. | 49/502 |
| 6,926,340 B2 | 8/2005 | Moriyama | |
| 6,932,415 B1 | 8/2005 | Van Houzen et al. | |
| 6,932,416 B2 | 8/2005 | Clauson | |
| 6,966,594 B2 * | 11/2005 | Wojewnik | 296/39.3 |
| 6,979,047 B2 * | 12/2005 | Lin et al. | 296/146.7 |
| 6,997,505 B2 * | 2/2006 | Dry et al. | 296/146.7 |
| 7,036,868 B2 * | 5/2006 | Kohara et al. | 296/146.7 |
| 7,055,887 B2 * | 6/2006 | Williams et al. | 296/146.7 |
| 7,059,659 B2 * | 6/2006 | Smith et al. | 296/146.7 |
| 2001/0017476 A1 | 8/2001 | Nishikawa et al. | |
| 2001/0030444 A1 | 10/2001 | Whitehead et al. | 296/146.7 |
| 2002/0084674 A1 | 7/2002 | Dobson | |
| 2002/0125734 A1 | 9/2002 | Pokorzynski et al. | 296/146.7 |
| 2004/0061348 A1 | 4/2004 | Takeda et al. | |
| 2005/0140166 A1 | 6/2005 | Dry et al. | |
| 2005/0184555 A1 | 8/2005 | Williams, II et al. | |
| 2005/0189789 A1 * | 9/2005 | Schmidt | 296/187.12 |
| 2005/0248181 A1 * | 11/2005 | Bigelow | 296/146.7 |
| 2006/0000149 A1 * | 1/2006 | Radu et al. | 49/502 |
| 2006/0017306 A1 * | 1/2006 | Smith et al. | 296/146.7 |
| 2006/0043764 A1 | 3/2006 | Schroder et al. | |
| 2006/0043765 A1 * | 3/2006 | Radu et al. | 296/146.7 |

FOREIGN PATENT DOCUMENTS

| | | |
|---|---|---|
| EP | 1128077 | 8/2001 |
| EP | 1215084 A2 | 6/2002 |
| FR | 2704487 | 11/1994 |
| GB | 2287740 A | 9/1995 |
| GB | 2360322 | 9/2001 |
| GB | 2397088 | 7/2004 |
| JP | 07323440 A | 7/1991 |
| JP | 03157222 A | 6/2006 |
| WO | 02/06682 A2 | 1/2002 |
| WO | 2002/06682 | 1/2002 |

OTHER PUBLICATIONS

UK Patent Office, Combined Search and Examination Report for related UK Patent Application No. GB0606596.5, mailed Jun. 1, 2006.

U.S. Patent and Trademark Office, Office Action to related application U.S. Appl. No. 10/711,478 mailed Jan. 16, 2007.

* cited by examiner

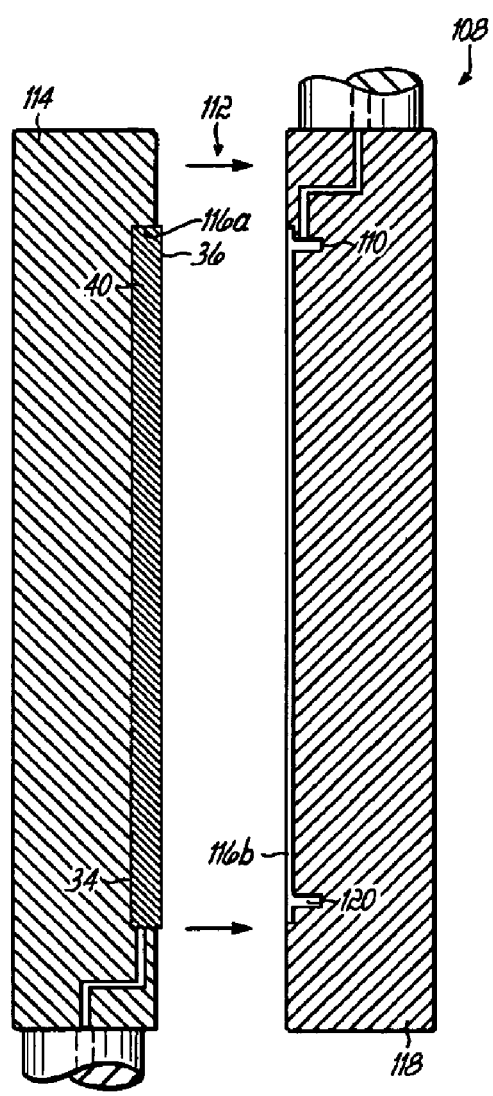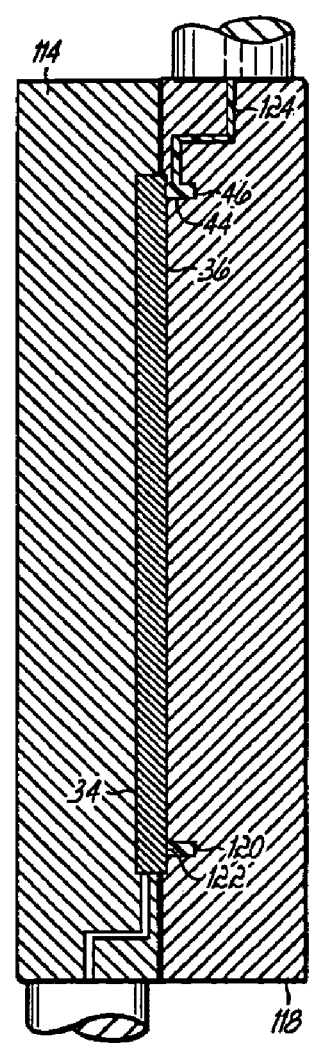
FIG. 4A
FIG. 4B

AUTOMOTIVE HARDWARE CARRIER AND METHOD OF MAKING SAME

CROSS-REFERENCE

The present invention is related to U.S. Ser. No. 10/708,411, filed Mar. 1, 2004, U.S. Ser. No. 10/708,407, filed Mar. 1, 2004, and U.S. Ser. No. 10/711,478, filed Sep. 21, 2004.

FIELD OF THE INVENTION

The present invention pertains generally to door trim panel assemblies for vehicle doors and, more particularly, to hardware carriers for door trim panel assemblies and a method of making the same.

BACKGROUND OF THE INVENTION

Vehicle door constructions typically feature a metal doorframe with a sheet metal outer panel or skin that defines the door's exterior and an inner sheet metal panel secured to the doorframe about abutting edges to form a hollow shell. Various door components, i.e. hardware, including window regulator rails, audio speakers, latches, and the like, typically are fastened in openings defined in the inner sheet metal panel. Prior to fastening, the hardware components may be mounted to a hardware carrier and then delivered as a separate pre-assembled module to the assembly line.

The pre-assembled carrier typically functions as a non-structural support member wherein the hardware components are initially mounted to the carrier but later secured to the doorframe that provides the primary support therefore.

These types of hardware carriers may be composed of polymers including polypropylene providing for lighter-weighted carriers. In contrast, carriers may also function as a structural support member that primarily supports the hardware. For example, window regulator rails can transfer the weight of the door window pane directly to the carrier plate. Accordingly, these carrier plates may be formed from steel or a structural composite material with sufficient strength to support the door components.

The carrier, along with the hardware components, can be fastened to the doorframe with fasteners, and a trim panel installed thereover to complete the door panel trim assembly and provide an aesthetically pleasing facade viewed by occupants seated in the passenger compartment of the motor vehicle. Notably, it can be desirable to provide the hardware carrier with a seal around the periphery thereof that cooperates with the inner sheet metal panel of the doorframe. The seal is intended to provide a water barrier and prevent water from infiltrating the interior of the door, via the various door openings, and wetting the interior surface of the trim panel. One drawback for these types of hardware carriers is in the current manufacturing thereof.

The current process for making a hardware carrier having a seal typically includes first forming the body of the carrier in a mold. The body then is removed from the mold and a seal material, e.g. a foam adhesive, is independently applied as a continuous bead along the top surface of the carrier in a second, separate operation. Finally, the carrier is placed on a rack within a drying oven to allow the seal sufficient time to cure.

As such, under current manufacturing processes, hardware carriers comprise several different time-consuming steps. These multiple step processes in turn lead to significant labor costs, which increases the overall costs of production. In addition, the foamed, adhesive seal includes a porous, outer skin that can be easily damaged, such as during installation of the carrier, and has a tendency to absorb water. The seal also includes a simple, linear configuration providing a rounded, top surface defining a marginal surface area for contacting the doorframe. As a result, the seal has a tendency to provide ineffective sealing between the doorframe thereby allowing for water leakage into the vehicle.

There is thus a need for an improved hardware carrier having a seal for creating a watertight barrier that reduces the labor and time required for manufacture thereof thereby reducing overall manufacturing costs

SUMMARY OF THE INVENTION

The present invention provides for an improved hardware carrier for door trim panel assemblies, and a method of making the same.

To this end, the hardware carrier includes a body having a front and back surface, and is adapted so that back surface can be coupled to a door trim panel such as by fastening means commonly known in the art, e.g. screws. Notably, the hardware carrier also may function, itself, as the door trim panel such that the back surface thereof defines the A-side, or interior side, of the door. In this fashion, the door trim panel is effectively integrated into the hardware carrier. The carrier body also is adapted to receive one or more hardware components, such as window regulators, door latches, etc., to provide either a structural or non-structural support member therefore, and further may include one or more openings to receive the hardware components. The body is formed of a first material that generally can include a thermoplastic material such as glass filled polypropylene and the like. The choice of material can be dependent upon whether the carrier functions as a structural or non-structural support member for the hardware components.

The carrier further includes a seal molded to the front surface of the body for contacting the door structure, i.e. the doorframe, of a vehicle to seal the carrier thereto. The seal is formed of a second material that generally can include a thermoplastic elastomer or natural rubber material, advantageously a non-porous, durable rubber material to limit the wear and tear of the seal, as well as to limit water absorption thereby. Notably, the second material must be chosen to bond sufficiently to the first material to allow for molding of the second material thereto. The seal may be provided with any desired configuration, such as a simple linear configuration, but advantageously is provided with a non-linear configuration defined by opposing top and bottom surfaces of the seal and opposing first and second side walls of the seal which connect the top and bottom surfaces. The top surface advantageously includes a planar surface. The non-linear configuration of the seal, in conjunction with the top planar surface, provides a substantial surface area for contacting the doorframe to prevent water leakage within the vehicle.

In an exemplary embodiment, the hardware carrier includes a body having a front and back surface and a seal molded to front surface. The seal advantageously includes SBR rubber. The body advantageously is composed of glass-filled polypropylene. The seal further includes a substantially repeating v-shaped configuration defined by opposing top and bottom surfaces of the seal and opposing first and second side walls of the seal which connect the top and bottom surfaces. The top surface includes a planar surface for contacting the doorframe to prevent water leakage within the vehicle, and the bottom surface is molded to the top surface of the body. In another embodiment, the non-linear configuration includes first and second non-linear configurations such that one side of the seal defines the first configuration and the other side defines the second configuration.

The hardware carrier is formed by a two shot molding operation. In a first shot of the molding operation, a first curable material is injected into a mold to form the carrier body having front and back surfaces. A variety of openings, additionally, may be formed therein so as to accommodate the placement of hardware components. The body further is adapted for coupling to a door structure, i.e. the doorframe, as well as to a door trim panel if applicable. Next, a mold chamber is formed about at least a portion of the front surface of the carrier. A second curable material then is injected into the mold chamber in a second shot of the molding operation to form the seal whereby the seal bonds to the body. The seal, advantageously, is provided with a non-linear configuration such as a substantially repeating v-shaped, s-shaped, and/or o-shaped configuration. After the second material has been allowed time sufficient to cure, the hardware carrier is ready to receive one or more hardware components and/or is ready to be coupled to a door trim panel, if necessary, and doorframe of a motor vehicle.

In an exemplary embodiment, a mold assembly having a mold including top and bottom portions is provided for molding the hardware carrier. The top portion of the mold includes opposing sides with one side having two first shot mold halves and the other side having two second shot mold halves. The bottom portion of the mold includes first and second mold halves. One each of the first and second shot mold halves are adapted to mate with one of the first and second shot mold halves of the bottom portion. Specifically, the top portion is adapted to rotate about a central axis so that one each of the two first and second shot mold halves of the top portion can mate with a corresponding mold half of the bottom portion to mold, in sequence, the body then the seal. The molded seal advantageously includes a substantially v-shaped configuration and a top planar surface for providing a watertight barrier.

By virtue of the foregoing, there is thus provided an improved hardware carrier including a seal adapted to provide an effective watertight seal between a doorframe of a motor vehicle, and a method of making the same.

The features and objectives of the present invention will become more readily apparent from the following Detailed Description taken in conjunction with the accompanying drawings

BRIEF DESCRIPTION OF THE DRAWING

The accompanying drawings, which are incorporated in and constitute a part of this specification, illustrate embodiments of the invention and, together with a general description of the invention given above, and the detailed description given below, serve to explain the invention.

FIG. 4A is the first in a series of sequential cross-sectional views utilizing another embodiment of a mold assembly to illustrate the second shot of the molding operation of the hardware carrier;

FIG. 4B is the second in this series of cross-sectional views; and

DETAILED DESCRIPTION OF THE DRAWINGS

Figure 1:
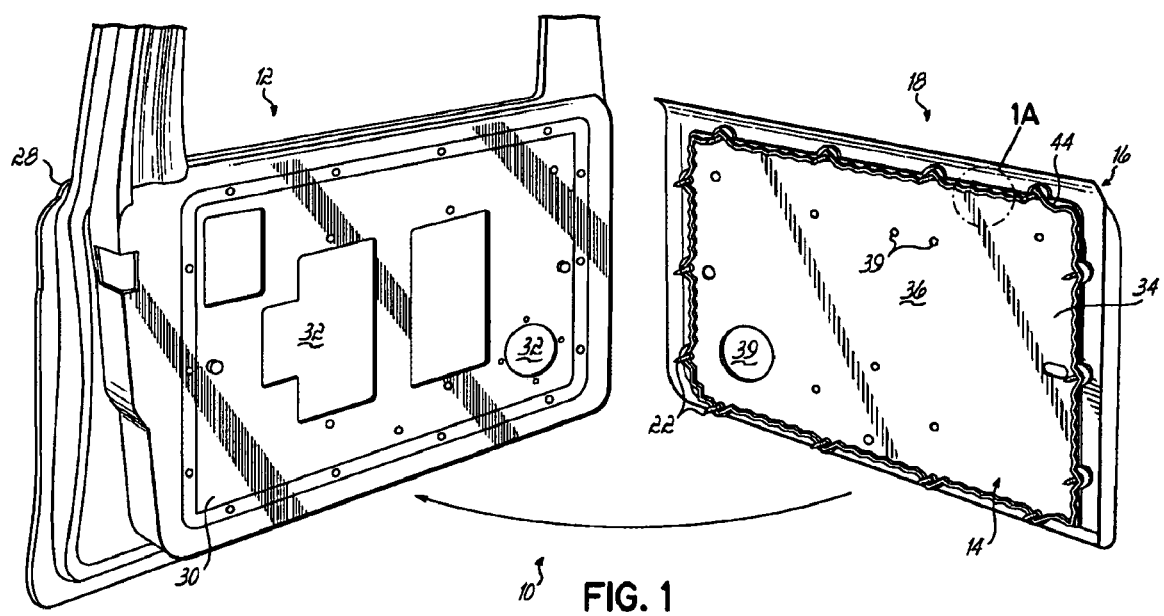
FIG. 1 is a perspective view of an automotive door assembly, including an embodiment of the hardware carrier of the present invention.

In FIG. 1, there is shown a door vehicle assembly 10 for an automobile (not shown) including a doorframe 12 and an embodiment of the hardware carrier 14 of the present invention coupled to a door trim panel 16 to define a door trim panel assembly 18, i.e. a door panel.

The door trim panel 16 is a relatively rigid substrate which forms at least a portion of the structural support and defines the general shape of the door trim panel assembly 18. The trim panel 18 may be supported on and releasably secured to the carrier 14 by fastener means 22 commonly known in the art. These fastener means 22 may include screws, nails, tacks, clips, adhesive, and the like, and typically are configured for releasing the trim panel 16 from the carrier 14. Although not illustrated, it should be understood that the hardware carrier 14 also may function, itself, as the door trim panel 16 such that a back surface 38 of the carrier 14 defines an A-side, or interior side, of the door vehicle assembly 10. In this fashion, the door trim panel 16 is effectively integrated into the hardware carrier 14 that alone defines the door trim panel assembly 18.

The doorframe 12 includes an outer panel 28 or skin that defines the exterior of the vehicle door assembly 10 and an inner panel 30 that defines the interior side of the doorframe 12. The hardware carrier 14 is coupled to the doorframe 12 on the interior side so that the carrier 14 is supported between the door trim panel 16 and the doorframe 12. More specifically, the carrier 14 may be supported on and releasably secured to the doorframe 12 by the fastener means 22. Various door components (not shown), i.e. hardware, including window regulator rails, audio speakers, latches, and the like, typically are fastened in openings 32 defined in the inner panel 30.

Figure 5:
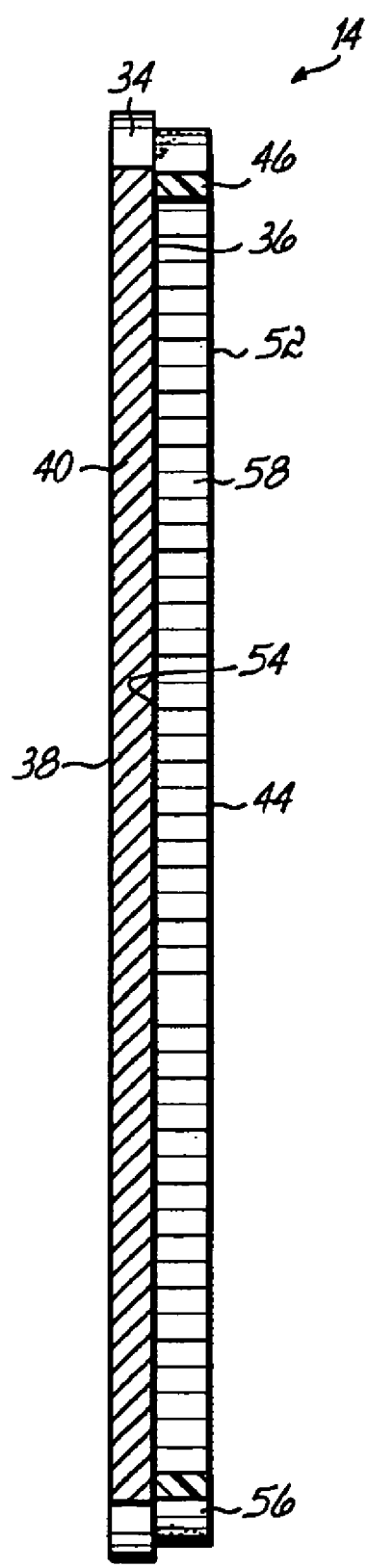
FIG. 5 is a cross-sectional view of the formed hardware carrier of FIGS. 3B and 4B removed from the mold.

As best shown in FIGS. 1 and 5, the carrier 14 includes a body 34 having a front surface 36 and the back surface 38. The body 34 is adapted so that back surface 38 can be coupled to the door trim panel 16, when the carrier 14 does not also function as the door trim panel 16, and so that the front surface 38 can be coupled to the doorframe 12 by the fastening means 22. The carrier 14 may receive one or more of the hardware components (not shown) to provide either a structural or non-structural support member therefore. More specifically, if the carrier 14 functions as a non-structural support, the hardware components are initially mounted to the carrier 14 but later secured to the doorframe 12, which provides the primary support therefore. In contrast, if the carrier 14 functions as a structural support member, the carrier 14 primarily supports the hardware. The hardware components may be secured to the body 34 of the carrier 14 via the fastening means 22 and further may be supported in openings 39 formed therein.

The body 34 is formed of a first material 40 such as a thermoplastic material, advantageously polypropylene or polycarbonate/acrylonitrile butadiene styrene, more advantageously glass-filled polypropylene. The choice of the first material 40 can be dependent upon whether the carrier 14 functions as a structural or non-structural support member for the hardware components such that sufficient material strength may be necessary to support the door components when the carrier 14 functions as a structural support member.

The carrier 14 further includes a seal 44 molded to the front surface 36 of the body 34, generally about the periphery thereof, and is adapted for contacting and compressing against the doorframe 12 to provide a water barrier and prevent water from infiltrating the interior of the door assembly 10, via the various openings 32, 39 of the doorframe 12 and the carrier 14, and wetting the trim panel 16. The seal 44 is formed of a second material 46 such as a thermoplastic elastomer or natural rubber material, advantageously, a non-porous, durable rubber such as SBR rubber or neoprene to limit the wear and tear of the seal 44, as well as to limit water absorption thereby. Notably, the second material 46 must be able to bond sufficiently to the first material 40 to allow for molding of the seal 44 to the body 34.

Figure 1A:
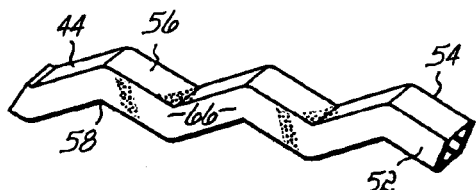
FIG. 1A is an enlarged view of the incircle portion 1A showing the seal of FIG. 1.
Figure 1B:
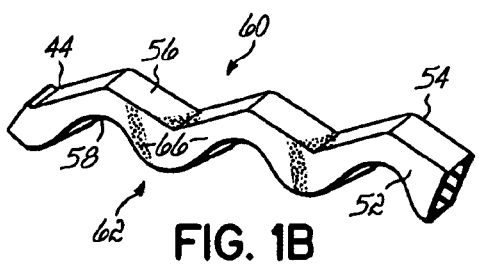
FIG. 1B is a view similar to FIG. 1A showing another embodiment of the present invention.

As best shown in FIGS. 1 and 1A, the seal 44 further advantageously is provided with a non-linear configuration and, more specifically, a substantially repeating v-shaped configuration defined by opposing top and bottom surfaces 52 and 54 of the seal 44 and opposing first and second side walls 56 and 58 of the seal 44 connecting the top and bottom surfaces 52, 54. It should be understood by the artisan that the seal 44 could include any desired linear and/or non-linear configuration including, but not limited to, substantially repeating s-shaped configurations, o-shaped configurations, combinations thereof, and the like. In addition, as best shown in FIG. 1B, the artisan should understand that one side 60 of the seal 44 could include one or more different non-linear configurations than an opposing side 62. More specifically, FIG. 1B shows one side 60 including a substantially repeating v-shaped configuration while the opposing side 62 includes a substantially repeating s-shaped configuration.

As further shown in FIGS. 1A and 1B, the top surface 52 of the seal further defines a planar surface 66 while the bottom surface 54 is bonded to the front surface 36 of the body 34. The non-linear configuration of the seal 44, in conjunction with the top planar surface 66, provides a substantial surface area for contacting the doorframe 12 to prevent water leakage within the vehicle (not shown).

Figure 1C:
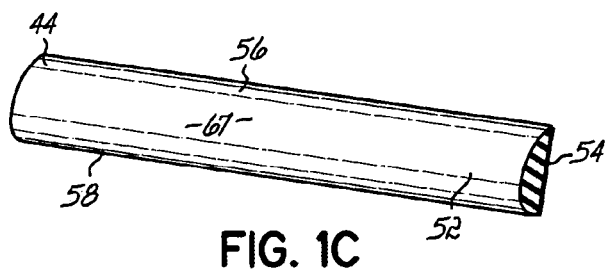
FIGS. 1C-1F are views similar to FIG. 1A showing additional embodiments of the present invention.

As indicated above, the seal 44 alternatively may include a linear configuration, as best shown in FIG. 1C, wherein the seal 44 has opposing top and bottom surfaces 52, 54 and opposing first and second side walls 56, 58 connecting the top and bottom surfaces 52, 54. Here, the top surface 52 defines a rounded portion 67 for contacting the doorframe 12 with the bottom surface 54 being bonded to the front surface 36 of the body 34.

Figure 1E:
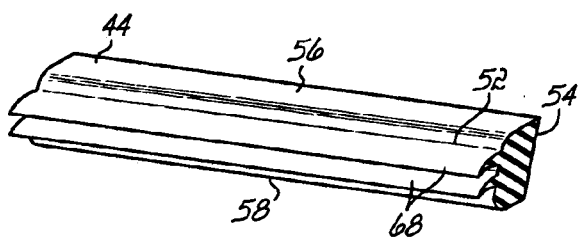
Figure 1D:
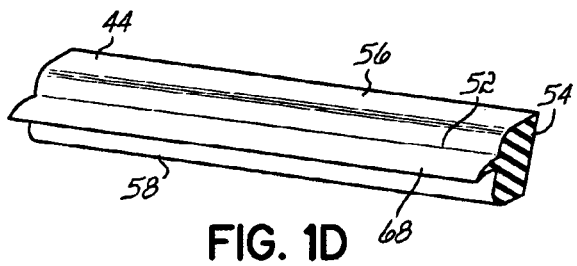
Figure 1F:
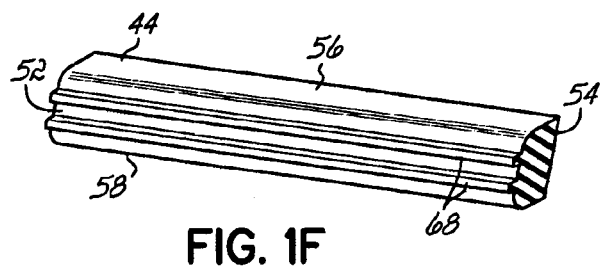

In additional embodiments, as shown in FIGS. 1D, 1E, and 1F, the seal 44 may include opposing top and bottom surfaces 52, 54 and opposing first and second side walls 56, 58 connecting the top and bottom surfaces 52, 54 with the top surface 52 being provided with one or more protrusions 68 extending away therefrom for contacting the doorframe 12. The protrusion(s) 68 may take on any form or shape such as a blade, rib, nib, bump, and the like. The bottom surface 54 of the seal 44 is bonded to the front surface 36 of the body 34.

Figure 2:
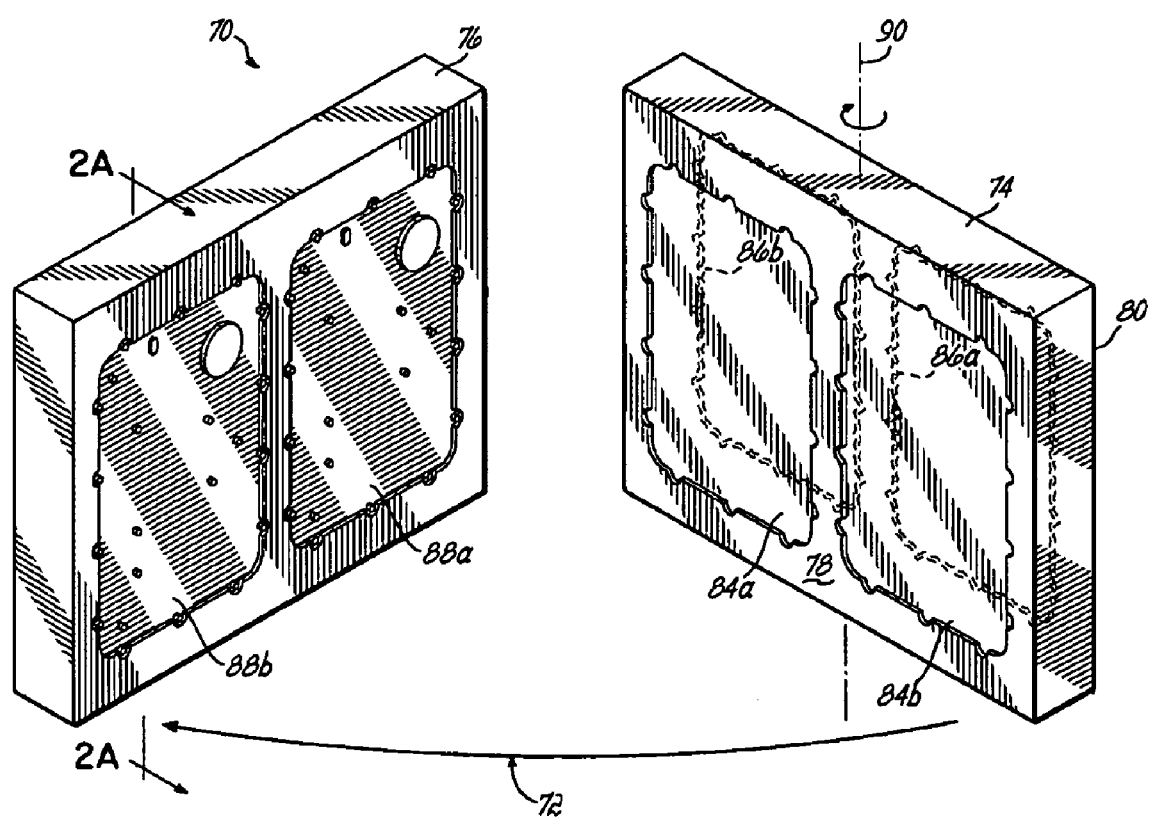
FIG. 2 is a perspective view of a mold assembly used to form the hardware carrier of the present invention.

With reference to FIGS. 2-5, methods of making the hardware carrier 14 of the present invention will now be described. Specifically, the hardware carrier 14 is formed by a two shot molding operation wherein a first shot molds the body 34, and wherein a second shot molds the seal 44. To this end, a single mold assembly 70 is shown in FIG. 2 including a mold 72 having a top and bottom portion 74 and 76. The top portion 74 includes opposing sides 78 and 80 with one side 78 having first shot mold halves 84a and 84b and the opposing side having second shot mold halves 86a and 86b. The bottom portion 76 includes first and second mold halves 88a and 88b with each mold half 88a, 88b adapted to mate with one each of the first and second shot mold halves 84a, 84b and 86a, 86b. The top portion 74 further is adapted to rotate about a central axis 90 so that each of the first and second shot mold halves 84a, 84b and 86a, 86b of the top portion 74 can mate with the corresponding mold halves 88a, 88b of the bottom portion 76 to mold, in sequence, first the body 34 then the seal 44 of the hardware carrier 14. It should be understood by the artisan that any number of cooperating mold halves (i.e. more or less than shown) may be provided within the top and bottom portions 74, 76 for molding the hardware carrier 14. In addition, the top portion 74 may rotate in any manner suitable so that the desired number of mold halves cooperate to produce the carrier 14.

Figure 2A:
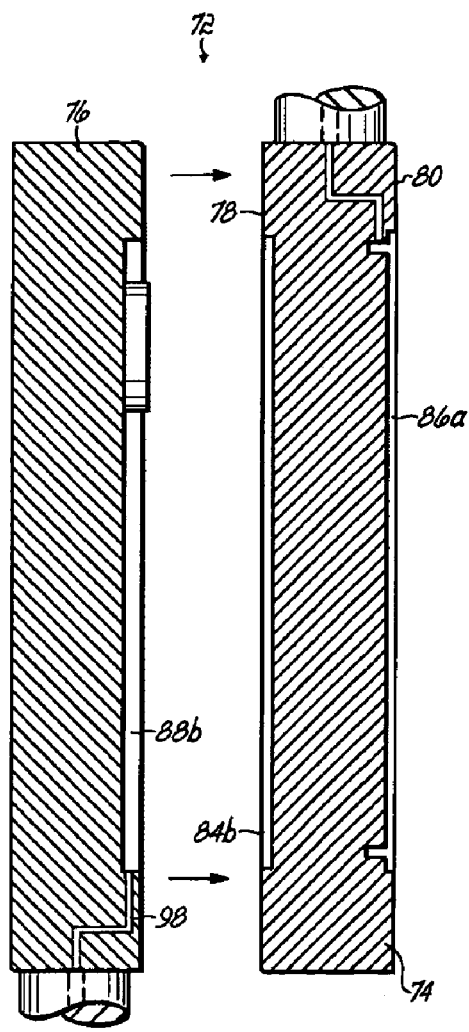
FIG. 2A is the first in a series of sequential cross-sectional views of the mold of FIG. 2 taken along the lines 2A-2A illustrating the first shot of the molding operation of the hardware carrier.
Figure 2B:
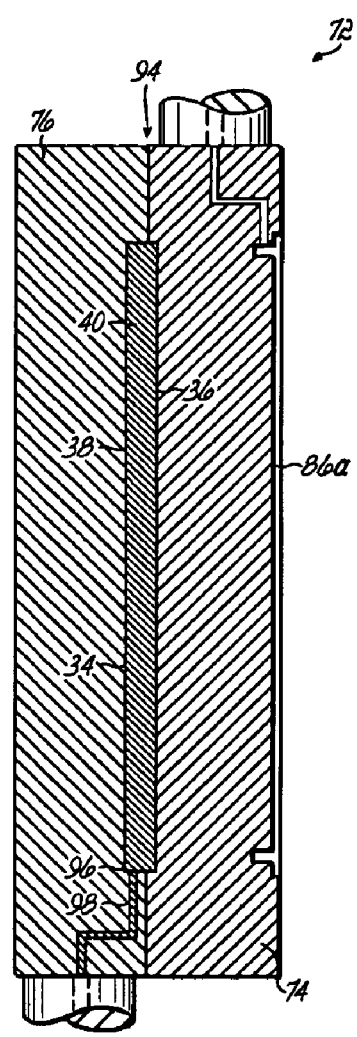
FIG. 2B is the second in this series of cross-sectional views.

While the first and second shots of the molding operation are further described below utilizing the cross-sectional views of FIGS. 2 and 3, i.e. mold halves 84b, 86b, and 88b, it is understood that the first and second shot molding process occurs in the same fashion with respect to mold halves 84a, 86a, and 88a. Accordingly, as best shown in FIGS. 2A and 2B, the first shot mold half 84b of the top portion 74 mates with its respective mold half 88b of the bottom portion 76 to define a first mold 94 having a cavity 96 therein. In a first shot of the molding operation, the first curable material 40 is injected through a channel 98 into the cavity 96 of the first mold 94 to form the carrier body 34 having front and back surfaces 36, 38. The first curable material 40 may be a thermoplastic material, advantageously polypropylene or polycarbonate/acrylonitrile butadiene styrene, most advantageously glass-filled polypropylene. A variety of openings 39 (See FIG. 3) may be formed therein so as to accommodate the placement of hardware components (not shown) and for coupling of the carrier 14 to the doorframe 12, as well as to the door trim panel 16 (if applicable). Coupling may be accomplished by the use of the fastener means 22.

Figure 3:
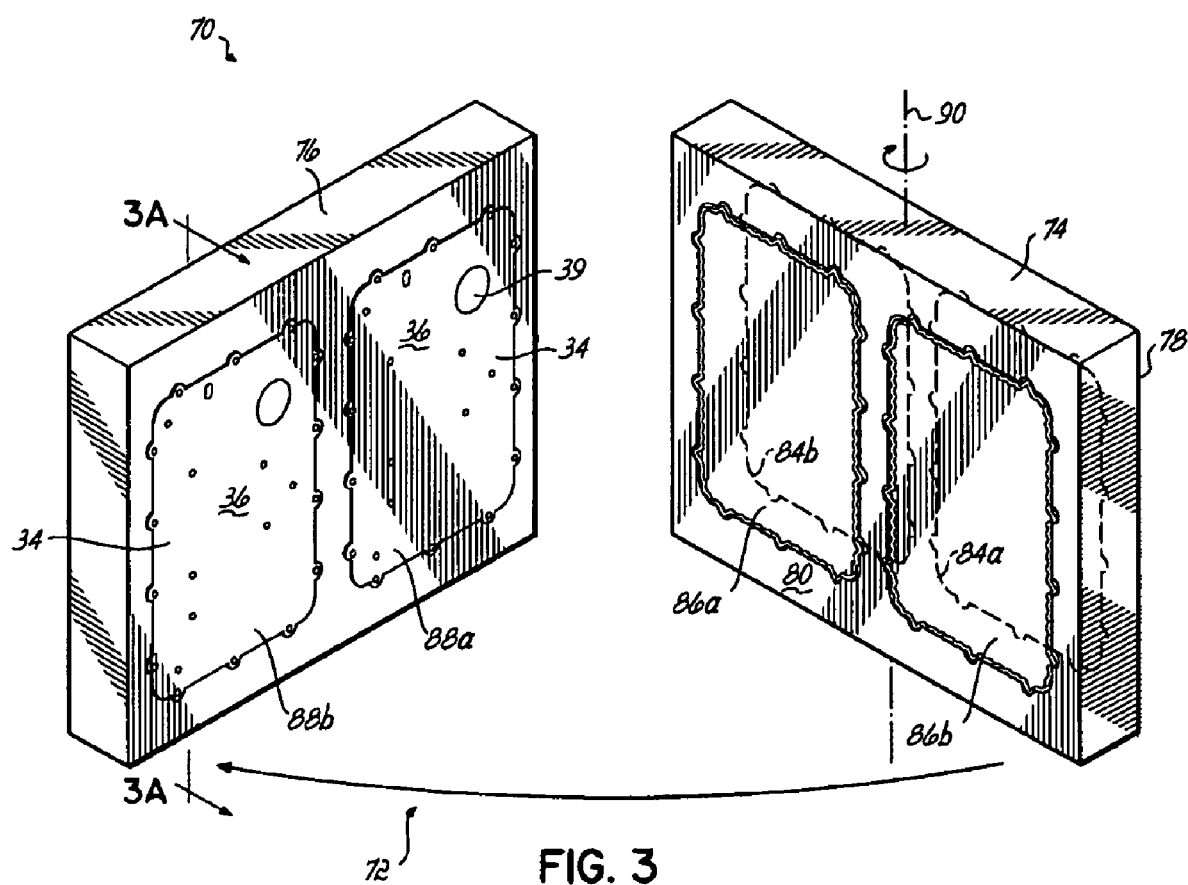
FIG. 3 is a perspective view of the mold assembly of FIG. 2 depicting the mold position for forming the seal of the hardware carrier.
Figure 3A:
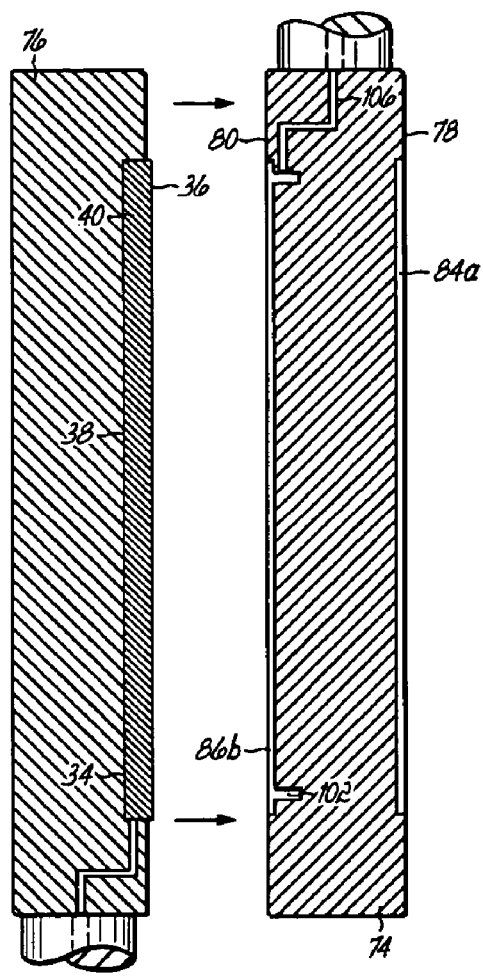
FIG. 3A is the first in a series of sequential cross-sectional views of the mold of FIG. 3 taken along the lines 3A-3A illustrating the second shot of the molding operation of the hardware carrier.
Figure 3B:
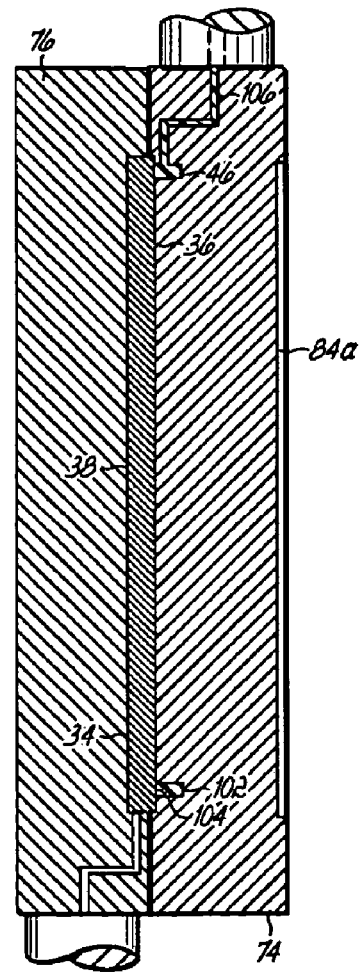
FIG. 3B is the second in this series of cross-sectional views.

With further reference to FIG. 3, the mold 72 next is opened and the top portion 74 is rotated about the central axis 90 so that the second shot mold halves 86a, 86b of the top portion 74 are facing the mold halves 88a, 88b of the bottom portion 76. As further shown in FIGS. 3A and 3B, the second shot mold half 86b then is mated with its respective mold half 88b to form a mold chamber 102 about a portion 104 of the front surface 36 of the body 34. The second curable material 46 then is injected through a channel 106, in a second shot, into the mold chamber 102 to form the seal 44, generally around the periphery of the body 34. The second curable material 46 is a thermoplastic elastomer or natural rubber material, advantageously a non-porous, durable rubber such as SBR rubber or neoprene. Notably, the second curable material 46 must be able to mold, i.e. bond, to the first material 40.

With respect to the molding operation, one may further mold the hardware carrier 14 by utilizing other methods such as by providing a mold assembly 108 (See FIGS. 4A and 4B) with a retractable portion 110, i.e. a slider. More specifically, as shown in FIGS. 4A and 4B, the mold assembly 108 may be provided with a mold 112 including a bottom portion 114 having a mold half 116a and a top portion 118 including a corresponding mold half 116b provided with the slider 110. It should be understood by the artisan that any number of cooperating mold halves may be provided within the top and bottom portions 114, 118 for molding the hardware carrier 14. The mold halves 116a, 116b are adapted to mate to form the carrier body 34, as explained above, then the slider 110 is retracted to form a mold chamber 120 about a portion 122 of the front surface 36 of the body 34 for molding the seal 44 thereto. Notably, the slider 110, in FIGS. 4A and 4B, is shown already retracted. As shown in FIG. 4B, the second curable material 46, as similarly explained above, is injected through a channel 124, in the second shot, into the mold chamber 120 to form the seal 44, generally around the periphery of the body 34.

As further shown in FIGS. 5 and 1A, the molded seal 44 includes the non-linear configuration, i.e. the substantially repeating v-shaped configuration, defined by the opposing top and bottom surfaces 52, 54 and the opposing first and second side walls 56, 58 connecting the top and bottom surfaces 52, 54. The bottom surface 54 is bonded to the front surface 36 of the carrier 14 and the top surface 52 includes the planar surface 66 for contacting the doorframe structure 12 to seal the carrier 14 thereto. Accordingly, other linear and/or non-linear configurations may be molded such as repeating s-shaped configurations, o-shaped configurations, and the like, as well as combinations of configurations. In addition, the mold assembly 70 may provide a seal 44 (See FIG. 1B) wherein one side 60 of the seal 44 could include one or more different non-linear configurations from the opposing side 62 of the seal 44.

After the second material 46 has been allowed time sufficient to cure, the mold 72 may be opened and the carrier 14 ejected therefrom. The formed carrier 14 includes the body 34 and the seal 44 molded thereto. The formed hardware carrier 14 now is ready to receive one or more hardware components (not shown) and/or is ready to be coupled to a door trim panel 16 and doorframe structure 12 of a motor vehicle. Accordingly, the molding operation of the present invention may be continuously performed utilizing a single mold assembly 70 to provide an improved automotive hardware carrier 14 including a seal 44 provided with one or more various shapes or configurations for creating a watertight barrier.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A door trim panel assembly for mounting to a doorframe structure of a motor vehicle, comprising:
   a hardware carrier having a body including a front and back surface; and
   a seal molded to the front surface and having a length and at least a first non-linear configuration, the first non-linear configuration being defined by opposing top and bottom surfaces of the seal and opposing first and second side walls of the seal, the first and second side walls connecting the top and bottom surfaces, the bottom surface being molded to the front surface of the carrier and the top surface being planar for contacting the doorframe structure to seal the carrier thereto, wherein the first non-linear configuration is repeated substantially along the entire length of the seal to define a repeating pattern when viewed from the top surface.

2. The door trim panel assembly of claim 1 further comprising a door trim panel, the back surface of the hardware carrier being coupled to the door trim panel.

3. The door trim panel assembly of claim 1 wherein the first non-linear configuration includes at least one of a substantially repeating v-shaped, s-shaped, and o-shaped configuration.

4. The door trim panel assembly of claim 1 further comprising at least a second non-linear configuration, one side of the seal including the first non-linear configuration and an opposing side of the seal including the second non-linear configuration.

5. The door trim panel assembly of claim 1 wherein the seal comprises a thermoplastic elastomer and the body comprises a thermoplastic material such that the seal bonds to the body.

* * * * *